(12) United States Patent
Warrick et al.

(10) Patent No.: US 9,060,197 B2
(45) Date of Patent: *Jun. 16, 2015

(54) HOSPITALITY MEDIA SYSTEM OPERATED BY MOBILE DEVICE

(71) Applicant: Guest Tek Interactive Entertainment Ltd., Calgary (CA)

(72) Inventors: Peter S. Warrick, Calgary (CA); Brendan G. Cassidy, Calgary (CA); Brian W. King, Calgary (CA); Lea Lorenzo, Calgary (CA); Blake Read, Calgary (CA); Ian S. McBeth, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 114 days.

This patent is subject to a terminal disclaimer.

(21) Appl. No.: 14/010,007

(22) Filed: Aug. 26, 2013

(65) Prior Publication Data

US 2013/0347028 A1    Dec. 26, 2013

Related U.S. Application Data

(63) Continuation of application No. 13/150,672, filed on Jun. 1, 2011, now abandoned.

(30) Foreign Application Priority Data

Jun. 7, 2010 (CA) .................................... 2709651

(51) Int. Cl.
*H04N 21/41* (2011.01)
*H04N 21/436* (2011.01)
(Continued)

(52) U.S. Cl.
CPC ...... *H04N 21/43615* (2013.01); *H04L 12/2809* (2013.01); *H04L 12/2814* (2013.01); *H04N 21/4126* (2013.01); *H04N 21/4131* (2013.01); *H04W 12/08* (2013.01)

(58) Field of Classification Search
CPC .......... H04N 21/2143; H04N 21/4126; H04N 21/43615; H04N 21/42204; H04N 5/4403; H04N 21/436; G07C 9/00031; G07C 9/00134
See application file for complete search history.

(56) References Cited

U.S. PATENT DOCUMENTS 7,061,393 B2    6/2006 Buckingham et al.
8,356,251 B2    1/2013 Strober
(Continued)

OTHER PUBLICATIONS

Execptional Innovation, "lifelware", dated Sep. 2009, downloaded from http://www.exceptionalinnovation.com/downloads/product-sheets/Lifeware.pdf on May 17, 2011, 2 pages.
(Continued)

*Primary Examiner* — Hai V Tran
(74) *Attorney, Agent, or Firm* — ATMAC Patent Services Ltd.; Andrew T. MacMillan

(57) ABSTRACT

A hospitality media system includes a media system controller and a plurality of controllable devices operable by the media system controller, each of a plurality of rooms having one or more in-room controllable devices. A communication module performs data communications with a mobile device. An authentication module receives identification information from the mobile device, determines a registered room currently associated with the identification information, and includes in an authorized subset of the controllable devices for which the mobile device is authorized to operate at least the in-room controllable devices of the registered room. The media system controller operates the authorized subset of the controllable devices in dependence upon commands received from the mobile device.

20 Claims, 11 Drawing Sheets

(51) Int. Cl.
*H04N 21/422* (2011.01)
*G07C 9/00* (2006.01)
*H04L 12/28* (2006.01)
*H04W 12/08* (2009.01)

(56) References Cited

U.S. PATENT DOCUMENTS

| | | | |
|---|---|---|---|
| 2003/0048757 | A1 | 3/2003 | Accarie et al. |
| 2003/0169714 | A1 | 9/2003 | Nakajima |
| 2004/0116115 | A1 | 6/2004 | Ertel |
| 2005/0207340 | A1 | 9/2005 | O'Neill |
| 2006/0112171 | A1 | 5/2006 | Rader |
| 2007/0176739 | A1 | 8/2007 | Raheman |
| 2008/0089277 | A1* | 4/2008 | Alexander et al. ............ 370/328 |
| 2008/0279117 | A1 | 11/2008 | Brisco et al. |
| 2009/0025055 | A1 | 1/2009 | White et al. |
| 2009/0070831 | A1 | 3/2009 | Bardehle et al. |
| 2009/0083805 | A1 | 3/2009 | Sizelove et al. |
| 2009/0125971 | A1 | 5/2009 | Belz et al. |
| 2010/0100725 | A1 | 4/2010 | Ozzie et al. |
| 2010/0191551 | A1* | 7/2010 | Drance et al. ..................... 705/5 |
| 2011/0099598 | A1 | 4/2011 | Shin et al. |

OTHER PUBLICATIONS

Execptional Innovation, "life|ware for iPhone and iPod touch", dated Sep. 2009, downloaded from http://www.exceptionalinnovation.com/products/documents/lifeware-iphone.pdf on May 17, 2011, 2 pages.

Execptional Innovation, "life|controller", dated Sep. 2009, downloaded from http://www.exceptionalinnovation.com/downloads/product-sheets/Lifecontroller.pdf on May 17, 2011, 2 pages.

Execptional Innovation, "Solutions Hospitality", downloaded from http://www.exceptionalinnovation.com/solutions/commercial/hospitality.php on May 17, 2011, 2 pages.

Execptional Innovation, "INNCOM Partners with EI to Offer Advanced, Integrated Hotel Technology Solutions", dated Oct. 27, 2009, downloaded from http://www.exceptionalinnovation.com/downloads/releases/2009/inncom-ei-20091027.pdf on May 17, 2011, 2 pages.

Joyce Essig, "Crestron and Intelity Partner on Industry-Changing Hospitality Solution", Jun. 22, 2009, 2 pages.

Danielle Storm, "Intelity Offers ICE in Software-Only Connect Version", Oct. 12, 2009, 2 pages.

George Koroneos, "5 Guest Room Tech Trends", Posted Date: Feb. 11, 2010, 3 pages.

Carrie Coolidge, "The Plaza in New York Offers iPads in all Guest Rooms and Suites (with Video)", Feb. 3, 2011, 2 pages.

Terry Gardner, "High-tech travel shortcuts", Feb. 21, 2011, 2 pages

Hospitality—Creston Electronics, Inc. (Printed in USA; Doc. 4745A 7/09), 20 pages.

Andreas Fasbender et al.; "Phone-controlled Delivery of NGN Services into Residential Environments"; The Second International Conference on Next Generation Mobile Applications, Services, and Technologies; © 2008 IEEE; 8 pages.

* cited by examiner

HOSPITALITY MEDIA SYSTEM OPERATED BY MOBILE DEVICE

CROSS-REFERENCE TO RELATED APPLICATIONS

This application is a continuation of U.S. patent application Ser. No. 13/150,672 filed Jun. 1, 2011, which claims the benefit of Canadian Patent Application No. 2,709,651 filed Jun. 7, 2010. Both of these applications are incorporated herein by reference.

BACKGROUND OF THE INVENTION (1) Field of the Invention

The invention pertains generally to hospitality media and entertainment systems. More specifically, the invention relates to operating a hospitality media system from a mobile device.

(2) Description of the Related Art

In order to meet guest expectations, hotels must provide increasingly sophisticated media entertainment systems. However, the increased sophistication inevitably results in increased complexity, and thus the systems become "scary" to new users who may be unfamiliar with the operation of many remotes and other equipment such as set-top boxes (STBs) and personal digital recorders (PVRs) that may be found in the rooms.

To solve this problem, hotel media systems are designed to be "user-friendly". This generally means control elements such as menus and control buttons be as intuitive as possible such that a guest can easily figure out how to use the system without first having to read instructions. However, regardless of how user-friendly a system may actually be, it will still be regarded as new and therefore troublesome by a guest who is unfamiliar with the system but who needs to learn it in order to enjoy their stay. Also, because the hardware vendors for different hotels (even of the same hotel chain) may differ, the physical appearance and other control aspects of in-room media and entertainment systems may also differ from hotel to hotel. Therefore, even if each system is itself user-friendly, frequent travelers who stay at many hotels may need to learn many different media systems. The process of learning to use yet another hotel media system can detract from the overall guest experience.

BRIEF SUMMARY OF THE INVENTION

According to an exemplary configuration of the invention there is provided a hospitality media system. The system includes a media system controller, and a plurality of controllable devices accessible from within a plurality of rooms of a hospitality establishment. The controllable devices are coupled to the media system controller by a computer network and are preconfigured such that each of the controllable devices is in communication with and remotely operable by the media system controller via the computer network. The system further includes a database storing an association between each of the rooms and one or more of the controllable devices that are accessible to a user within each room. The one or more of the controllable devices that are accessible within a particular room are hereinafter referred to as in-room controllable devices of the particular room. The media system controller is operable to generate a passkey in response to an occurrence of a first event associated with the particular room, and store in the database an association between the passkey and the particular room. The media system controller is further operable to cause the passkey to be displayed on a display device located within the particular room, whereby after being displayed in the particular room the passkey is entered into a mobile device by a user of the particular room. The media system controller is further operable to establish data communications with the mobile device and receive the passkey from the mobile device, and query the database to find the particular room currently associated with the passkey received from the mobile device, whereby the particular room currently associated with the passkey is found to be the particular room in which the passkey was displayed. The media system controller is further operable to query the database to find the in-room controllable devices of the particular room found associated with the passkey received from the mobile device, and include in an authorized subset of the controllable devices for which the mobile device is authorized to operate at least the in-room controllable devices of the particular room found associated with the passkey received from the mobile device. The media system controller is further operable to operate the authorized subset of the controllable devices in dependence upon commands received from the mobile device until an occurrence of a second event associated with the particular room, and remove from the database the association between the passkey and the particular room in response to the occurrence of the second event.

According to another exemplary configuration of the invention there is provided a method of operating a plurality of controllable devices accessible from within a plurality of rooms of a hospitality establishment. The controllable devices are coupled to a media system controller by a computer network and preconfigured such that each of the controllable devices is in communication with and remotely operable by the media system controller via the computer network. The media system controller has a database storing an association between each of the rooms and one or more of the controllable devices that are accessible to a user within each room, the one or more of the controllable devices that are accessible within a particular room hereinafter referred to as in-room controllable devices of the particular room. The method includes generating a passkey in response to an occurrence of a first event associated with the particular room, and storing in the database an association between the passkey and the particular room. The method further includes displaying the passkey on a display device located within the particular room, whereby after being displayed in the particular room the passkey is entered into a mobile device by a user of the particular room. The method further includes establishing data communications with the mobile device and receiving the passkey from the mobile device, and querying the database to find the particular room currently associated with the passkey received from the mobile device, whereby the particular room currently associated with the passkey is found to be the particular room in which the passkey was displayed. The method further includes querying the database to determine the in-room controllable devices of the particular room found associated with the passkey received from the mobile device, and including in an authorized subset of the controllable devices for which the mobile device is authorized to operate at least the in-room controllable devices of the particular room found associated with the passkey received from the mobile device. The method further includes operating the authorized subset of the controllable devices in dependence upon commands received from the mobile device until an occurrence of a second event associated with the particular room, and removing from the database the association between the passkey and the particular room in response to the occurrence of the second event.

According to yet another exemplary configuration of the invention there is provided a media system controller for operating a plurality of controllable devices accessible from within a plurality of rooms of a hospitality establishment. The controllable devices are coupled to the media system controller by a computer network and preconfigured such that each of the controllable devices is in communication with and remotely operable by the media system controller via the computer network. The media system controller includes a database storing an association between each of the rooms and one or more of the controllable devices that are accessible to a user within each room, the one or more of the controllable devices that are accessible within a particular room hereinafter referred to as in-room controllable devices of the particular room. The media system controller further includes one or more processors configured to generate a passkey in response to an occurrence of a first event associated with the particular room, and store in the database an association between the passkey and the particular room. The one or more processors are further configured to cause the passkey to be displayed on a display device located within the particular room, whereby after being displayed in the particular room the passkey is entered into a mobile device by a user of the particular room. The one or more processors are further configured to establish data communications with the mobile device and receive the passkey from the mobile device, and query the database to find the particular room currently associated with the passkey received from the mobile device, whereby the particular room currently associated with the passkey is found to be the particular room in which the passkey was displayed. The one or more processors are further configured to query the database to find the in-room controllable devices of the particular room found associated with the passkey received from the mobile device, and include in an authorized subset of the controllable devices for which the mobile device is authorized to operate at least the in-room controllable devices of the particular room found associated with the passkey received from the mobile device. The one or more processors are further configured to operate the authorized subset of the controllable devices in dependence upon commands received from the mobile device until an occurrence of a second event associated with the particular room, and remove from the database the association between the passkey and the particular room in response to the occurrence of the second event.

These and other embodiments and advantages of the invention will become apparent from the following detailed description, taken in conjunction with the accompanying drawings, illustrating by way of example the principles of the invention.

BRIEF DESCRIPTION OF THE DRAWINGS

The invention will be described in greater detail with reference to the accompanying drawings which represent preferred embodiments thereof.

DETAILED DESCRIPTION

Figure 1:
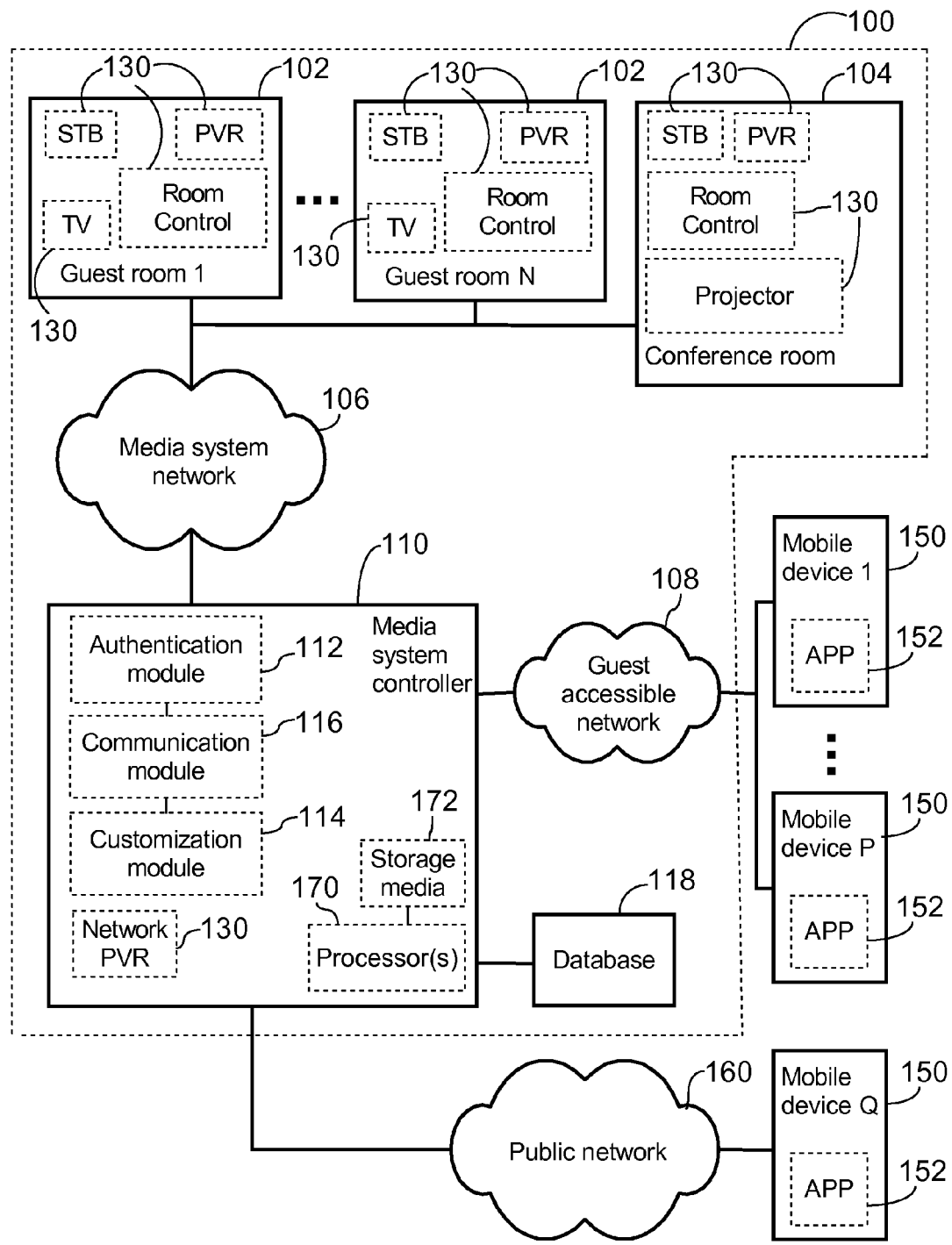
FIG. 1 is a block diagram of a hotel media system having controllable devices being operated by mobile devices according to an exemplary configuration of the invention.

FIG. 1 is a block diagram of a hotel media system 100 having controllable devices 130 being operated by a plurality of mobile devices 150 according to an exemplary configuration of the invention. In this configuration, a media system controller 110 includes an authentication module 112 and a customization module 114 coupled to a communication module 116. The media system controller 110 is coupled through a media system network 106 to each guest room 102 and to a conference room 104. The media system controller 110 is coupled to and communicates with the controllable devices 130 and delivers media and entertainment content through the media system network 106. Each guest room 102, 104 includes one or more in-room controllable devices 130 such as a set-top box (STB), personal video recorder (PVR), television (TV), projector, and room control box, which can each be operated by the media system controller 110. In this example, the room control box allows electronic control of elements in the room 102, 104 such as air conditioning, lighting, heating, fans, doors, windows, blinds, etc. Additionally, the media system controller 110 itself includes a networked personal video controller (network PVR) being a further controllable device 130. Any number and types of controllable devices 130 may be positioned throughout the hotel media system 100 in other configurations.

Guests of a hotel often have their own mobile devices 150 such as laptop computers, tablet computers, cell phones, music players, personal digital assistants (PDAs), digital cameras, global positioning systems (GPSs), and all other kinds of personal electronic gadgets. These mobile devices 150 may be coupled to the media system controller 110 through a guest accessible network 108 that is installed throughout the hotel and available to guests of the hotel, or through a public network 160 that may be available outside the hotel such as the Internet. In another configuration, the media system network 106 and the guest accessible network 108 may be the same network. Once connected to the media system controller 110, the mobile devices 150 may operate one or more of the controllable devices 130.

In one configuration, a custom application 152 may be pre-included on each mobile device 150 or may be downloaded and installed from the media system controller 130 or another source if it is not already present on the mobile device 150. According to the type of connecting network 108, 160, the application 152 automatically detects the hotel media system 100 and establishes data communications with the communication module 116. The customization module 114 may then provide customization information specific to this particular hotel media system 100 to the application 152. Examples of the information specific to a particular hotel media system 100 may include hotel name, branding logos, color schemes, welcome messages, authentication methods, etc. The application 152 utilizes this information to customize itself for this particular hotel and then identifies itself or its operator to the authentication module 112.

Authorization limits implemented by the authentication module 112 in conjunction with a database 118 such as the hotel's property management system (PMS) determine which controllable device(s) 130 may be operated by a particular mobile device 150. After determining an authorized subset of the controllable devices 130 for which a particular mobile device 150 is authorized to operate, the media system controller 110 transfers status information for the authorized controllable devices 130 to the particular mobile device 150 and operates the controllable devices 130 in the authorized subset in dependence upon commands received from the particular mobile device 150. For example, in FIG. 1, a first mobile device 150 (Mobile device 1 in FIG. 1) may be authorized to operate the STB, PVR, TV, and room control devices in a first guest room (Guest room 1 in FIG. 1), and a second mobile device (Mobile device Q in FIG. 1) may be authorized to operate the STB, PVR, room control, and projector in the conference room 104. Therefore, the first mobile device will only be able to see status information from and send commands to the in-room controllable devices 130 of the first guest room, and the second mobile device will only be able to see status information from and send commands to the in-room controllable devices 130 of the conference room 104.

Figure 2:
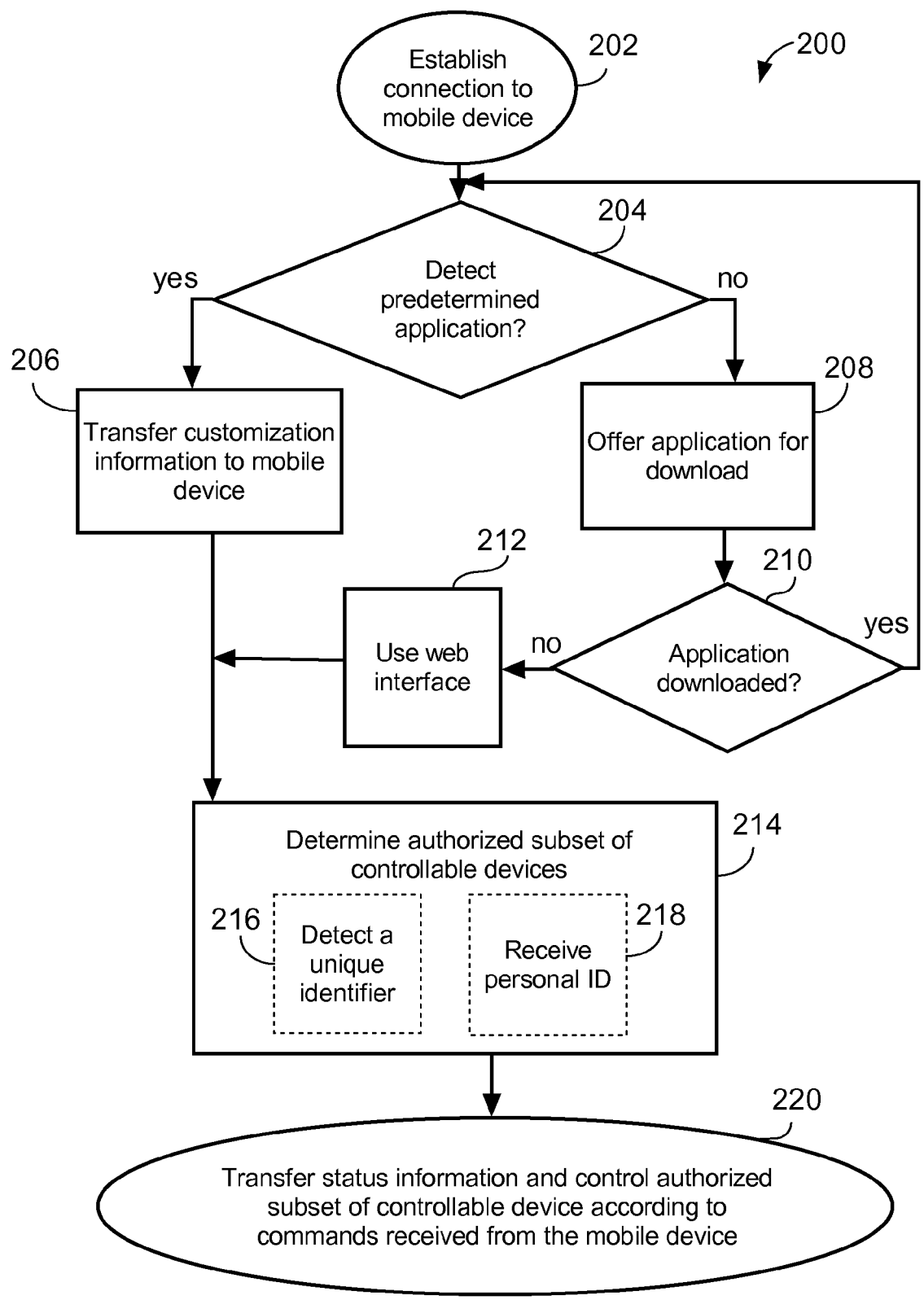
FIG. 2 is an operational flowchart of the hotel media system of FIG. 1.

FIG. 2 is an exemplary operational flowchart 200 of the hotel media system of FIG. 1. The steps of flowchart 200 are not restricted to the exact order shown, and, in other configurations, shown steps may be omitted or other intermediate steps added. In this configuration, the hotel media system 100 performs the following operations:

Step 202: A connection is established between the hotel media system 100 and a mobile device 150 in order to pass data between the media system 100 and the mobile device 150. To ensure privacy, the data flowing through the connection may encrypted in both directions such that a third party will not be able to read or understand any of the information. The connection may be established via wired access ports such as USB, FireWire, Ethernet, etc or wireless access ports such as using Bluetooth, Wi-Fi, WLAN, etc, and, as previously mentioned, a computer network used to make the connection may be a guest accessible network 108 available only on the hotel premises or via any public network 160 such as the Internet available from other locations such as a wireless hotspot at a local coffee shop. The connection to the mobile device 150 may be dynamically established through any computer network access ports, and the ports utilized may change as the mobile device 150 moves to new locations. In general, any type of connection may be established between the hotel media system 100 and the mobile device 150.

Step 204: The hotel media system 100 detects whether a media system control application 152 is running on the mobile device 150. This detection may be performed by attempting a connection to the mobile device 150 utilizing a predetermined handshake protocol that is known only to the application 152. Alternatively, the mobile device may simply identify itself and include a version number of the media system control application 152 if it is installed and running on the mobile device 150 at the time the connection is established.

Step 206: Assuming the mobile device 150 is running the application 152, the hotel media system 100 may next transfer customization information specific to this particular hotel media system 100 to the mobile device 150. By way of example, the customization information may provide any required information and data to properly brand the user interface (UI) of the application 152 and to enable or disable various features according to what is supported by this specific hotel media system 100. Transferring customization information to the mobile device 150 is useful because different hotel chains may all support the same mobile application 152 but will place their own logos on the application 152 for branding purposes. Also, some hotels may allow remote control of particular types of in-room devices as part of the media system 100 and others may not. Rather than transferring all the customization data, a customization token corresponding to a specific hotel may be transferred instead. In this configuration, customization information for the hotel corresponding to the token is already stored within the mobile device 150 and will be utilized by the application 152. Transferring only a hotel specific token speeds connection time for subsequent connections by the same mobile device 150 when the full customization information has already been downloaded.

Step 208: Because the media control application 152 was not detected, the hotel media system 100 offers the application 152 for download by the mobile device 150. In one configuration, the hotel media system 100 may automatically detect the type of the mobile device 150 and offer a compatible application 152. In another configuration, the media system 100 may provide a web interface allowing an operator of the mobile device 150 to select and choose a desired application from a list of supported device platforms. In yet another configuration, the application 152 may be stored and made available from a third-party site such as an application store. In this case, the hotel media system may provide a link to where the application 152 may be retrieved.

Step 210: If the user has downloaded the application 152 or at least indicated they plan to use the application 152 (if the application is available from a third-party), the hotel media system will return to step 204 and continue trying to detect the application 152. However, in some cases, the user of the mobile device 150 may not wish to use a custom media control application 152 and will instead opt to continue without installing the media application 152. Some aspects of controlling the hotel media system 100 are facilitated and enhanced by running a media control application 152 on the mobile device 150. One reason is the required data to be transmitted will be minimized if the device 150 already has the control application 152 installed. Another reason is automatic detection, connection, and authentication with the hotel media system 100 can be performed by an application but may need to be performed manually by a user of a web interface. Also, better integration with the UI of the mobile device 150 and background operation are both possible with a custom application 150. However, there is an advantage to not requiring users to install and run the media control application 152. For example, by providing a web interface to the hotel media system 100, full compatibility with any device that is able to browse the web is achieved. This may be useful to users who are unwilling or unable to install a custom application 152 on their mobile device 150.

Step 212: Because the mobile device is not running the media control application 152, the communication module 116 acts as a web server and a web interface is provided to the mobile device 150. Again, to ensure privacy and prevent unauthorized access from third parties, the web interface may be encrypted using a secure sockets layer (SSL).

Step 214: At this step, the hotel media system 100 determines an authorized subset of the controllable devices 130 for which the mobile device 150 is authorized to operate. Generally speaking, the authentication module 112 receives some identification information from the mobile device 150 corresponding to either the mobile device itself or an operator of the mobile device 150 and then looks up in a database 118 to determine which controllable devices 130 are permitted to be operated by this mobile device or operator. For example, the authentication module 112 may query a database 118 such as the hotel's property management system (PMS) to make sure the guest's name, MAC address, GSM SIM card number, passkey, and/or reservation number are correct for a particular hotel room and authorize the user. In this configuration, the database 118 includes data associating the identification information with one or more registered guest rooms and the authorized subset includes the in-room controllable devices 130 that are accessible from the room(s) for which the operator of the mobile device is currently registered. Steps 216 and 218 may also be utilized, alone or in combination, to receive the identification information corresponding to the mobile device 150 and/or the operator of the mobile device 150.

Step 216: The authentication module 112 may automatically detect a unique identifier received from the hardware or software of the mobile device 150. Some examples of unique identifiers include Global System for Mobile Communications (GSM) subscriber identity module (SIM) card number, media access control (MAC) address, internet protocol (IP) address, web browser identification from a previously stored cookie, media control application 152 serial number, etc. The unique identifier of the mobile device 150 can be mapped in the database 108 to the authorized subset of controllable devices. In one configuration, the authentication module 110 determines the registered guest room currently associated with the unique identifier by querying the database 108, which includes authentication data associating the unique identifier of the mobile device 150 with a registered guest room. The authentication module 110 then includes in the authorized subset at least the in-room controllable devices of the registered guest room.

Step 218: The authentication module 112 may receive user information corresponding to an operator of the mobile device 150 such as guest name, room number, company name, address, phone numbers, credit card number, passport number, etc. In this configuration, the database 108 includes authentication data associating the user information with the registered guest room(s) for the user. However, identification information received from the mobile device 150 need not be of a personal nature and may also be implemented using usernames, pass codes, or token numbers. For example, upon check-in, a guest may be provided with a password for use when authenticating their mobile device(s) 150 with the hotel media system 100. The password may be randomly generated by the media system controller upon guest check-in and stored in the database to indicate the registered guest room associated with the password. In this way, no personal identification information need be supplied by the guest either at check-in or when authenticating their mobile device(s) 150. Alternately, the authentication module 112 may automatically display a passkey on an interface such as a TV in the guest's room and ask the guest to enter this passkey to confirm the guest is registered for the particular room. This may be similar to the process used to pair Bluetooth devices, except the medium for transport of data could be wired, wireless, Bluetooth, cell, etc; and after receiving the correct passkey for a particular room, the authentication module 110 includes in the authorized subset all the in-room controllable devices of the guest room associated with the passkey. In another advantageous configuration, receiving the identification information corresponding to the operator of the mobile device 150 at step 218 may only need to be performed once per mobile device 150. Once received, a unique identifier from the mobile device 150 such as automatically detected at step 216 can be stored in the database 108 with an association to the registered guest room. For subsequent authentications by the same mobile device 150, the automatic detection of the unique identifier at step 216 may be sufficient to determine the registered guest room and authenticate the mobile device 150.

Step 220: Once the mobile device 150 is authenticated, the hotel media system 100 transfers any status information from the authorized subset of the controllable devices 130 to the mobile device 150, and controls the authorized subset of the controllable devices 130 according to commands received from the mobile device 150. For example, the status information may include UI menus for each of the controllable devices 130 in the authorized subset, and the commands received from the mobile device 150 may include UI selections for operating each of the controllable devices 130 in the authorized subset. At this step, the authorized subset of controllable devices 130 may be operated in accordance with commands received from the mobile device 150.

Other steps may also be included such as if a user is not authorized at step 214, actions such as providing an error message or other assistance to the guest may be provided by the hotel's media system 100. Because the user of the mobile device is not authenticated, the hotel media system 100 may provide only general services and information to the mobile device 150 but no specific room control services until the mobile device 150 tries to re-authenticate. Control may proceed back to step 214 when the mobile device tries to re-authenticate.

Figure 3:
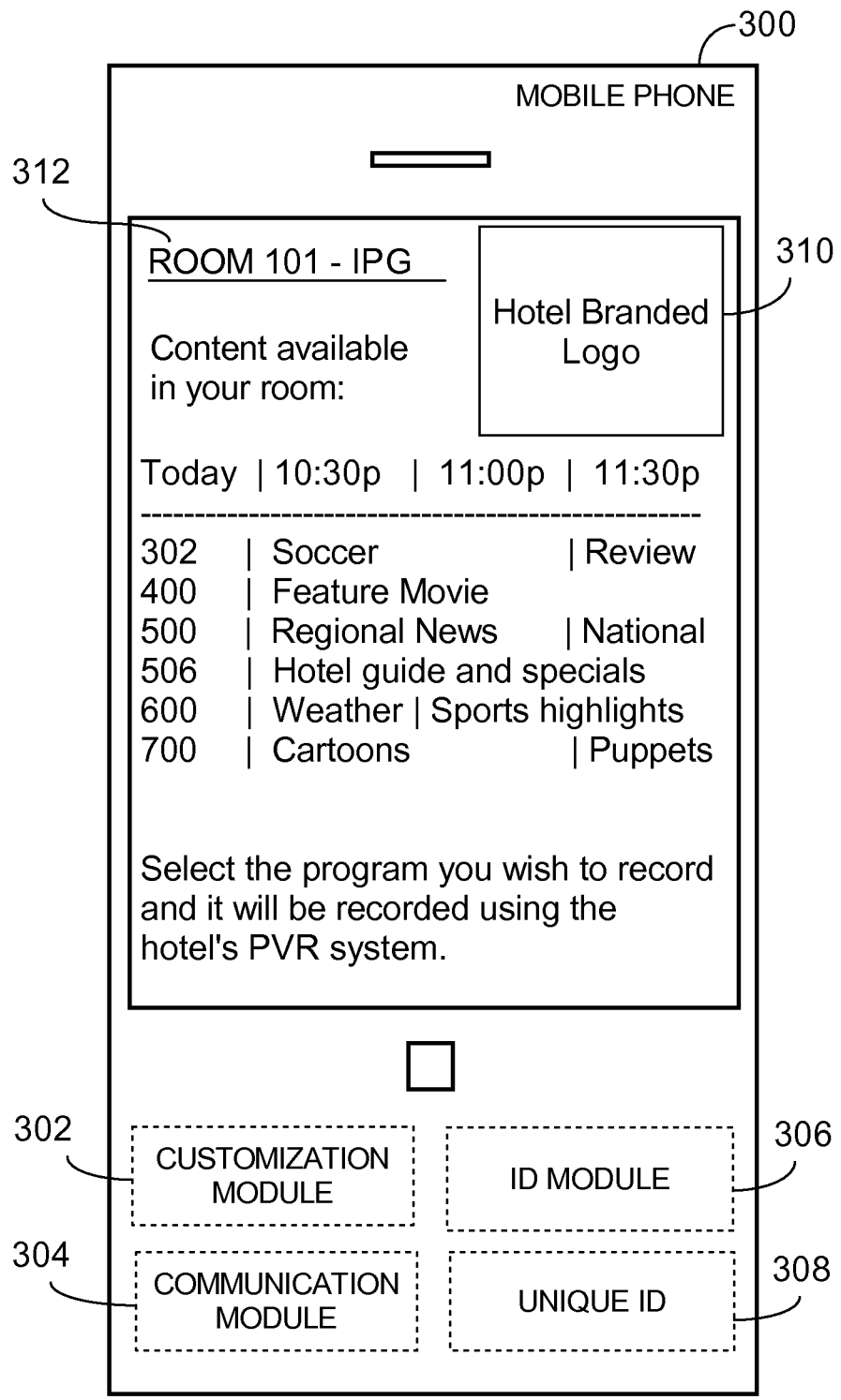
FIG. 3 is a block diagram of a mobile phone being one of the mobile devices of FIG. 1.

FIG. 3 is an exemplary block diagram of a mobile phone 300 being one of the mobile devices 150 of FIG. 1. In this configuration, the mobile phone 300 includes a user interface (UI) 312, a customization module 302, a communication module 304, an identification module 306, and a unique identification (ID) 308. The communication module 304 may be implemented in hardware as a part of the mobile phone. For example, the phone 300 may be equipped with Bluetooth, Wi-Fi, and WLAN capabilities. Any of these may therefore be utilized to establish a connection to the hotel media system 100 via either a guest accessible network 108, public network 160, or other available access port. In this configuration, control of the mobile phone 300 is performed by a custom media control application 152 having been previously installed. However, as mentioned above, the invention may alternatively operate utilizing a web interface or the application 152 may be downloaded and installed as a part of the connection procedure. Compiled, semi-compiled code such as a Java or interpreted code such as JavaScript may also be utilized to perform the role of the media control application 152.

As an example of beneficial usage, as shown in FIG. 2, the authorized subset of the controllable devices 150 for the mobile phone 300 may include at least a PVR of a hotel room (hotel room 101 in FIG. 3). Therefore, the UI 312 of the mobile phone 300 shows an interactive program guide (IPG) of content available on the hotel's media system 100 as recordable by the PVR of room 101. Note that different rooms in the hotel may have different available content, and part of the status information sent from the hotel media system 100 to the mobile phone 300 included the content that was actually recordable by the PVR in room 101. An operator of the mobile phone 300 may schedule the PVR of room 101 to record content listed on the IPG by interacting with the UI 312 of the mobile phone 300. Corresponding commands will be sent from the mobile phone 300 to the hotel media system 100 and the hotel media system 100 will utilize these commands to operate the PVR of room 101. Additional status messages such as confirmation of the recording or conflict messages will be passed back to the UI 312 as required. In this way, the mobile phone 300 may operate the PVR of room 101 from any location as long as a connection to the media system 100 is available. The mobile phone 300 may also be authorized to operate other in-room controllable devices 130 and these other in-room controllable devices 130 could be selected and controlled using the UI 312 in a similar way. In one configuration, the media system controller 110 transfers status information to the mobile phone 300 such as data for displaying the IPG on the mobile phone 300 customized to list only the content that is available on the in-room controllable devices 130 of the guest's registered room. A benefit of such operation is a guest staying in a budget room will not see content listed on the IPG that is only available in other rooms of the hotel with higher entitlements.

Regarding additional features of the phone 300, the customization module 304 of the mobile phone 300 receives the customization information sent from the customization module 114 of the media system controller 110. For example, a hotel branded logo 310 may be utilized by the mobile phone 300 to customize the UI 312 when operating the media system 100 at a particular hotel. The ID module 306 is responsible for identifying the mobile phone 300 to the hotel media system 100 and may also store identification information that needs to be remembered for authentication purposes. For example, a pass code that a guest was given at check-in for authenticating their mobile device(s) 150 may be stored within the ID module 306. The ID module 306 may also automatically pass a unique ID 308 such as the GSM SIM card number, MAC address, software serial number, or browser cookie to the authentication module 112 of the hotel's media system controller 110 to allow determination of the authorized controllable devices.

Figure 4:
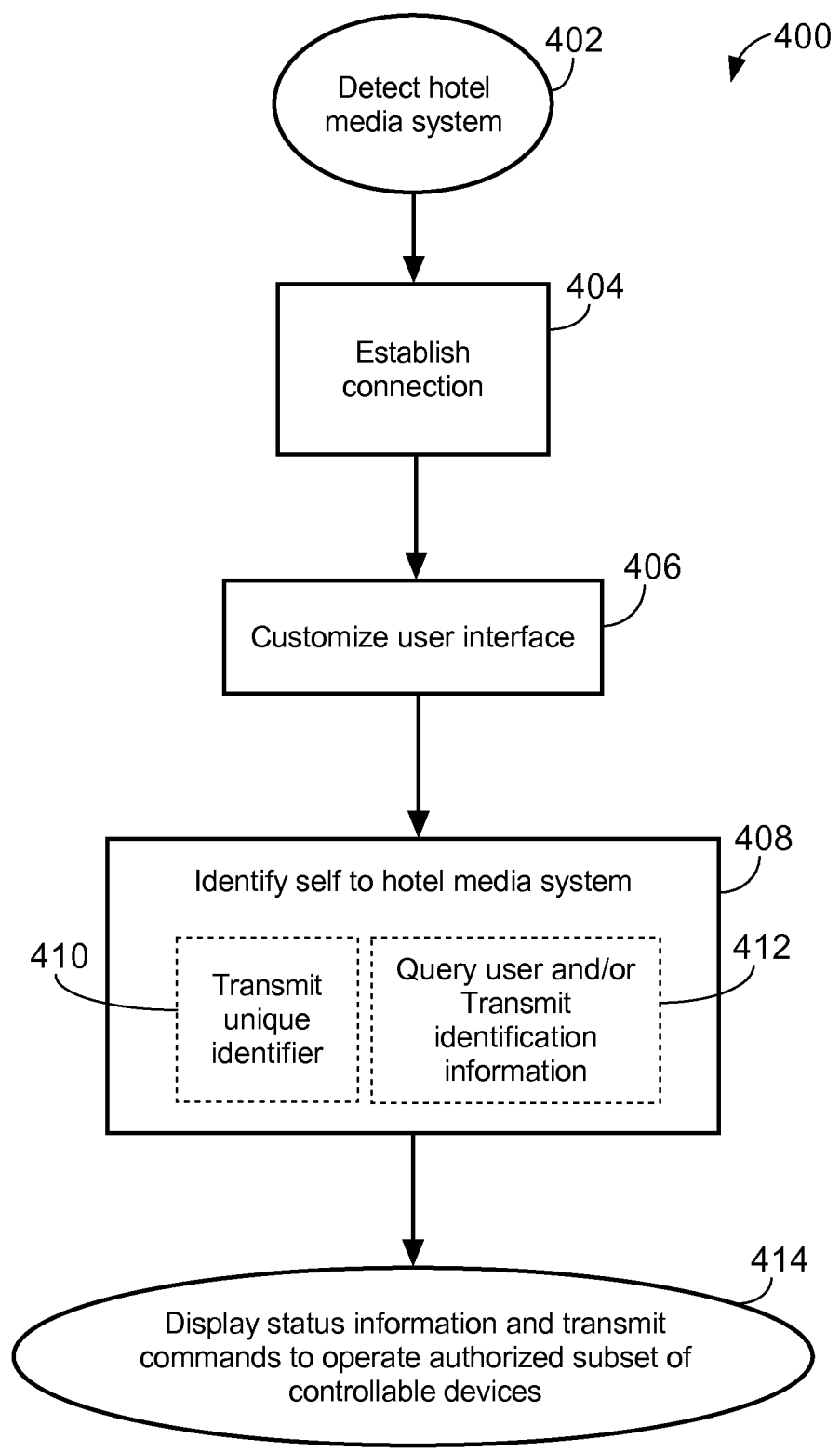
FIG. 4 is an operational flowchart of the mobile phone of FIG. 3.

FIG. 4 is an exemplary operational flowchart 400 of the mobile phone 300 of FIG. 3. The mobile phone 300 of FIG. 3 is taken as an example but similar steps may also apply to the other mobile devices 150 of FIG. 1. The steps of flowchart 400 are not restricted to the exact order shown, and, in other configurations, shown steps may be omitted or other intermediate steps added. In this configuration, the mobile phone 300 performs the following operations:

Step 402: The mobile phone 300 may automatically detect the existence of the hotel media system by recognizing a hotel Wi-Fi access point by service set identifier (SSID), recognizing a cell tower identification that is near the hotel, determining the mobile phone 300 is physically located near a predetermined GPS coordinate corresponding to the geographic location of the hotel as detected by a GPS unit (not shown) of the mobile phone 300, detecting a hotel's Bluetooth network or infrared signal, establishing a wired connection with the hotel's Ethernet or DSL system, or by simply recognizing broadcast packets from the hotel that are received on one of the mobile phone's 300 network interfaces at communication module 304. The SSIDs, cell tower IDs, GPS coordinates, and formats of broadcast packets of various hotels may be preprogrammed as a part of the media control application 152 or may be stored remotely such as at a publically accessible Internet site that is periodically accessed by the application 152. In a manual configuration, an operator of the mobile phone 300 may manually specify or select the network interface and destination hotel name or address such as a domain name that corresponds to the hotel. This may be beneficial if the guest is not physically near the hotel and is instead accessing the hotel media system 100 through a public network 160 such as the Internet.

Step 404: Once the hotel's media system 100 is detected, in one configuration, the communication module 304 of the mobile phone 300 performs data communication with the hotel media system such as by establishing a two-way data connection with the communication module 116 of the hotel's media system controller 110. Again, this connection and the data transferred through the connection may be encrypted for privacy. Other data communication methods may also be utilized in other configurations including connectionless datagram communication types, for example.

Step 406: The mobile phone 300 customizes its user interface according to the particular hotel and any customization information that is received from the hotel. This may include branding information such as the hotel logo 310, color schemes or other elements.

Step 408: The ID module 306 identifies the mobile phone 300 to the authentication module 112 of the hotel's media system controller 100. Because the goal may actually be to identify the user of the mobile phone 300, one method may be to query the user of the mobile phone 300 to enter, via a UI prompt, their name and room number and then pass this information to the hotel media system 100. This user information could already be known by the application so it could be done automatically without requiring user interaction. (User had already entered their name on the device and the room number was known at the time of reservation.) For privacy and security reasons, it is not necessary that any personal information be transmitted to the media system 100 to perform authentication. Another method to authenticate the mobile phone 300 would be via a MAC address or GSM SIM card number of the user's device that was associated with the guest during the reservation process. A registration confirmation number could also be utilized. Another method may be to authenticate with the media system 100 through a passkey given out by an interface in the room (i.e. through the TV). Sub steps 410 and 412 contain more information about identification techniques and may be performed together in either order or only one may be performed according to different configurations.

Step 410: The ID module 306 transmits a unique identifier of the mobile device such as the mobile phone's GSM SIM card number or MAC address to the authentication module 112.

Step 412: The ID module 306 transmits identification information corresponding to a user of the mobile device to the authentication module 112. The ID module 306 may first utilize the UI 312 to query a user of the mobile phone for the identification information and store it within the ID module 306, or the identification information may already be stored within the ID module 306.

Step 414: The mobile phone 300 now displays the status information received from the authorized subset of controllable devices 150 and transmit commands to operate the authorized subset of controllable devices 150. Each of the authorized controllable devices 150 may be operated using a separate screen on the UI 312 of the mobile phone if space is limited. Alternatively, on a mobile device 150 such as a laptop computer, all of the (or multiple) authorized controllable devices 150 may be visible on a single screen.

Figure 5:
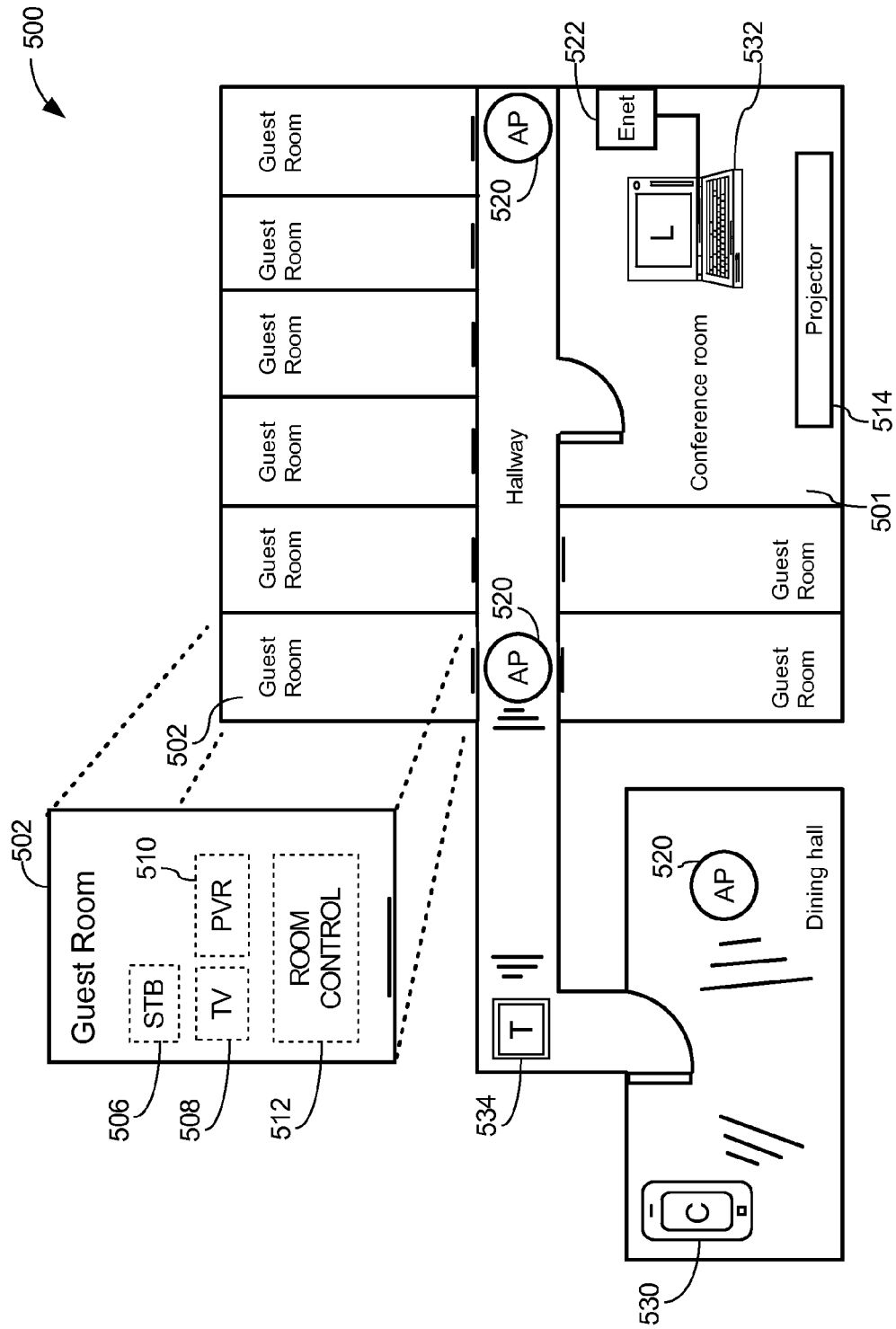
FIG. 5 illustrates a hotel floor plan having multiple controllable devices being remotely operated by various mobile devices according to another exemplary configuration of the invention.

FIG. 5 illustrates a hotel floor plan 500 having multiple controllable devices 506, 508, 510, 512, 514 being remotely operated by various mobile devices 530, 532, 534 according to another exemplary configuration of the invention. As shown in FIG. 5, the hotel includes a plurality of guest rooms including a particular room 502 being shown with an expanded view. As shown in the expanded view, installed in guest room 502 are several in-room controllable devices including a STB 506, TV 508, PVR 510, and room control box 512; and installed in a conference room 501 is an in-room controllable projector 514. Access ports for a guest accessible computer network 108 are distributed throughout the hotel including wireless access points (APs) 520 and a wired Ethernet connection 522. In this example, there are three mobile devices illustrated including a cell phone 530, a laptop computer 532, and a tablet computer 534.

Figure 6:
FIG. 6 shows an exemplary data structure of a database for performing authentication of the mobile devices of FIG. 5.

FIG. 6 shows an exemplary data structure of a database 118 for performing authentication of the mobile devices 530, 532, 534 of FIG. 5. The database structure 600 includes authentication data for each mobile device 530, 532, 534 organized in rows with a mobile device column 602 indicating the particular mobile device name, a MAC address column 604 indicating a unique ID being associated with the hardware of the mobile device, a registered rooms column 606 indicating one or more registered guest rooms currently associated with the mobile device, and an authorized subset of controllable devices column 610 indicating the subset of the possible controllable devices 506, 508, 510, 512, 514 that are authorized to be operated. As illustrated, in this configuration, the authorized subset of controllable devices column 610 includes the in-room controllable devices of the guest rooms included in the registered rooms column 606. Other configurations of the database 118 may also be utilized. For example, rather than (or in addition to) the MAC address column 604, a user information column may be included to associate certain user information such as the guest's name or login ID with one or more registered guest rooms and corresponding in-room controllable devices.

Figure 10:
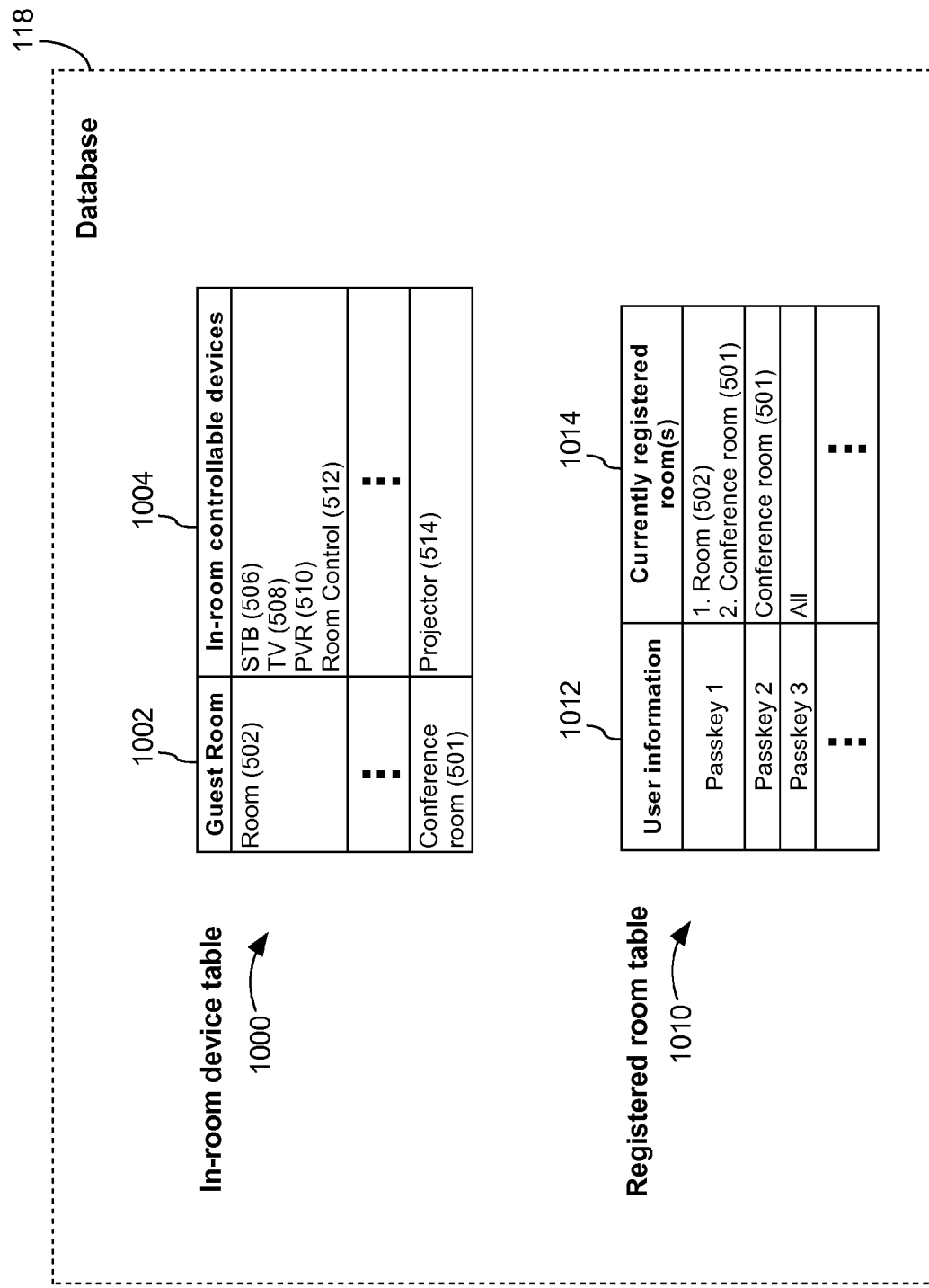
FIG. 10 illustrates an exemplary data structure of a multi-table database for performing authentication of the mobile devices of FIG. 5.

FIG. 10 illustrates an exemplary data structure of a multi-table configuration of database 118 for performing authentication of the mobile devices of FIG. 5. In this example, in-room device table 1000 specifies the one or more in-room controllable devices of each guest room. This table 1000 may be generally static and only change when the installed devices in one of the rooms is changed such as during installation or system upgrades. Registered room table 1010 is utilized to dynamically associate user identification information being passkeys in this example with one or more currently registered guest rooms. Table 1010 may be updated as guests check in and out of the hotel and/or change their room assignments. For example, the passkey for the conference room 501 may be changed with each booking so that users of a first conference will not be able to use the same passkey to control devices in the conference room 501 during a second conference. Likewise, the passkey associated with a particular guest room may be changed each time a new guest enters the room.

Rather than (or in addition to) the passkeys stored in user information column 1012, in another configuration, users may also be required to both specify the correct passkey and other user information such as the name of a guest currently staying in the room. The authentication module 112 receives identification information from a mobile device such as a passkey entered by the user or stored within the mobile device, queries the registered room table 1010 to determine the registered guest room currently associated with the received identification information, and includes in the authorized subset of the controllable devices for which the mobile device is authorized to operate at least the in-room controllable devices of the registered guest room(s) as specified in the in-room device table 1000. Upon successful authentication of the mobile device using user information column 1012, a unique identifier of the mobile device may also be stored and associated with one or more registered guest rooms so that the mobile device can be automatically authenticated upon next usage according to the unique identifier rather than the passkey. Combinations of the database structures of FIG. 6 and FIG. 10 may also be utilized.

Figure 11:
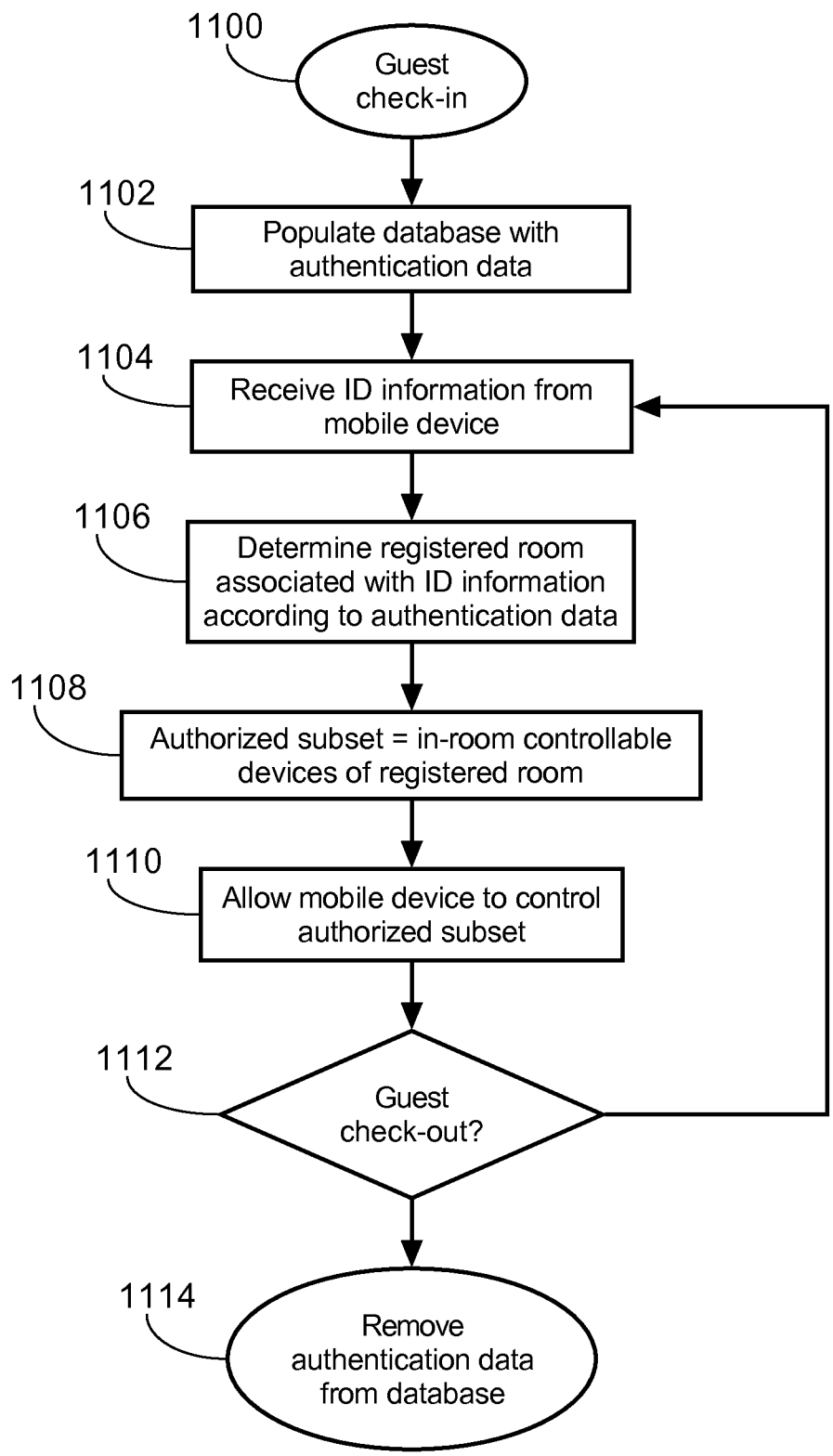
FIG. 11 is a flowchart illustrating an example of how authentication data may be utilized by the hotel media system of FIG. 1.

FIG. 11 is a flowchart illustrating an example of how authentication data may be utilized by the hotel media system of FIG. 1. The steps of the flowchart are not restricted to the exact order shown, and, in other configurations, shown steps may be omitted or other intermediate steps added. In this configuration, the hotel media system 100 performs the following operations:

Step 1100: When a guest checks in to one of the rooms in the hotel, control proceeds to step 1102. Other situations may also be deemed equivalent to guest check-in such as when a guest changes or upgrades to a different room.

Step 1102: The database 118 is populated with authentication data. For example, authentication data such as the passkey in the user information column 1012 and corresponding registered room(s) in the currently registered room(s) column 1014 may be generated and added to the registered room table 1010 at this step. The same passkey may also be provided to the guest at the front desk upon check-in, or may be selectively displayed when needed on a display device in the guest's room such as the in-room TV.

Step 1104: After data communications have been established between the guest's mobile device and the media system controller 110, the authentication module 112 receives ID information from the mobile device. Continuing the above example, the received ID information may include the passkey as entered by the guest in order to prove they are the current guest of one or more of the hotel rooms.

Step 1106: The authentication module 112 determines the registered guest room currently associated with the identification information. For example, the authentication module 112 may perform a lookup operation matching the received passkey with the same passkey stored in the user information column 1012 of registered room table 1010. In this way, the currently registered room(s) column 1014 on the matching row indicates the registered guest room currently associated with the passkey.

Step 1108: The authentication module then assigns the in-room controllable devices of the registered guest room determined at step 1106 to be the authorized subset for which the mobile device is authorized to control. For example, the authentication module 112 may perform a lookup operation to match the registered guest room determined at step 1106 with the same guest room stored in the guest room column 1002 of in-room device table 1000. The matching row indicates the corresponding in-room controllable devices in column 1004.

Step 1110: The media system controller operates the authorized subset of the controllable devices determined at step 1108 in dependence upon commands received from the mobile device. In some situations involving simple commands such as volume control or channel changes, there may not be any feedback returned to the mobile device; however, preferably this step also involves sending status information corresponding to the authorized subset of the controllable devices to the mobile device. The status information helps to allow the guest to operate the in-room controllable devices even when the guest is away from the registered room.

Step 1112: When the guest checks out of the registered guest room, control proceeds to step 1114; otherwise, control returns to step 1104.

Step 1114: The authentication data is removed from the database in order to thereby de-authorize the guest's mobile devices from continuing to operate the in-room devices. In this way, should the same identification information be received at step 1104, it will no longer be associated with the registered guest room at step 1106.

In a modification of the above-described flowchart, rather than populating the database 118 with the authentication data immediately after guest check-in, the authentication information of step 1102 may be dynamically added to the database 118 when the passkey is displayed on the display device in the registered guest room. In another example, the authentication data stored in the database 118 at step 1102 may corresponds to personal information of the guest dynamically added to the database 118 when the guest checks in to the registered guest room. Other steps may also be added to the flowchart of FIG. 11. For example, additional authentication data associating the unique identifier of the mobile device with the registered guest room may be dynamically added to a database table such as that illustrated in FIG. 6 when the guest registered to the room first utilizes the mobile device to authenticate with the media system controller 110.

Each mobile device 520, 532, 534 may operate the subset of the controllable devices for which it is authorized even when it is not located in the same room as the controllable device it is trying to operate. For example, as illustrated in FIG. 5, the cell phone 530 may operate the PVR 510 even while the cell phone 530 is located in the dining hall. Also, as shown in FIG. 6, in this example, all mobile devices 530, 532, 534 may operate the projector 514 in the conference room 501. This could be the situation because the operator of the cell phone 530 is a registered guest of room 502 and also a speaker of a conference, the operator of the laptop 532 may also be a speaker of the conference but is not staying at the hotel, and the tablet 534 may be carried by hotel staff to assist guests as needed and therefore is authorized to operate all controllable devices 506, 508, 510, 512, 514 in the hotel.

De-authorization of one or more controllable devices 506, 508, 510, 512, 514 may be performed by modifying the database accordingly. For example, to de-authorize the cell phone 530 from controlling the STB 506, the STB 506 may be removed from the authorized subset of controllable devices column in the FIG. 6. In one configuration, de-authorization may coincide with when the guest checks out of the registered guest room. In another configuration, it may also be useful to de-authorize a particular controllable device 130 or mobile device 150 when a conference or other hotel event ends, when a specific time period or time duration ends, during a specific time interval such as to disable staff users from controlling devices during the evening or early morning so they don't accidentally disturb the guest, etc. Allowing a user to de-authorize themselves may also be useful in some instances such as when a guest wants to lend their mobile device 150 to a third party.

Furthermore, de-authorization of a controllable device may occur on a device-level or a feature-level. For example when a guest checks out of a hotel their mobile device 150 may be de-authorized to control the TV and other in-room devices 130 but may still be authorized to review their portfolio, message inbox, etc. In another example a mobile device 150 may be de-authorized to watch or record certain TV channels due to parental lock control settings.

Figure 7:
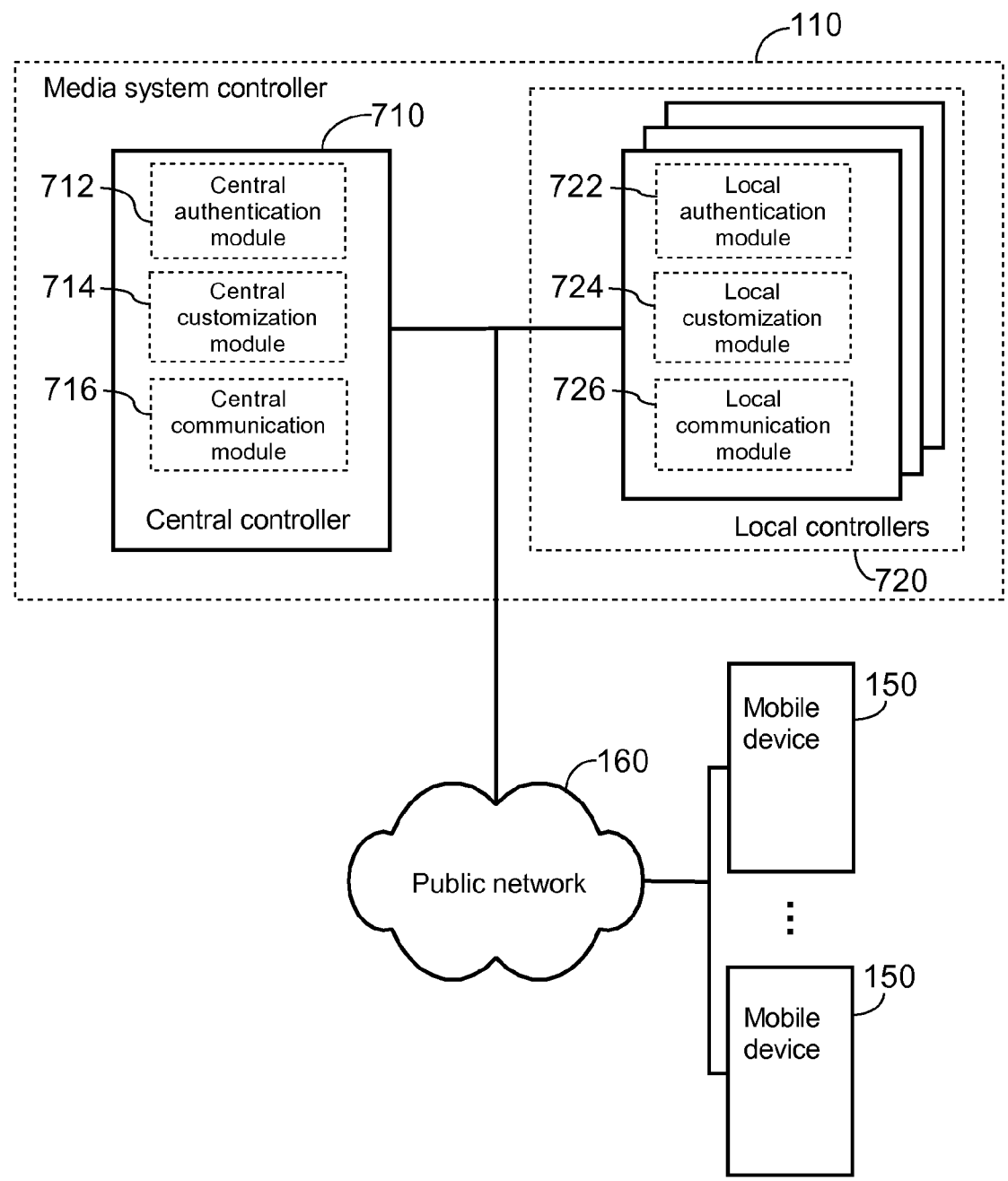
FIG. 7 illustrates the media system controller of FIG. 1 being divided into a central controller and a plurality of local controllers according to another configuration of the invention.

FIG. 7 illustrates the media system controller 110 of FIG. 1 being divided into a central controller 710 and a plurality of local controllers 720 according to another configuration of the invention. In this configuration, the central controller 710 includes a central authentication module 712, a central customization module 714, and a central communication module 716; and each of the local controllers 720 includes a local authentication module 722, a local customization module 724, and a local communication module 726. The central controller 710 may be located at an off-site location such as a media system vendor server room, and each of the local controllers 720 may be located on-site at the various hotels incorporating the media system 100. Communication between the central controller 710 and the local controllers 720 may be via a direct link or may be through the public network 160. Encryption and/or virtual private network (VPN) links may be utilized to ensure secure communication between the central controller 710 and the various local controllers 720.

When a mobile device 150 connects to the media system controller 110 via the public network 160, communication is first established with the central communication module 716. Customization and authentication may be performed by the central controller 710 using the central customization module 714 and the central authentication module 712 according to techniques similar to what was already described above for FIG. 1. In this configuration, information in the database 118 in FIG. 1 may also be located at the central location. Alternately, the modules 712, 714, 716 in the central controller 710 may each operate in tandem with the corresponding modules 722, 724, 726 in the local controller 720 at the hotel for which the mobile device 150 is associated. Information stored at the central controller may include a mapping of each known mobile device 150 to a particular local controller 720. In the event that an unknown mobile device 150 connects to the central controller 710, the central controller 710 may query the mobile device 150 to identify to which hotel it is associated. This allows the central controller 710 to create the mapping to the correct local controller 720 and then the appropriate customization and authentication would occur utilizing the local customization module 724 and the local authentication module 722 at the local controller 720 in that hotel.

Figure 8:
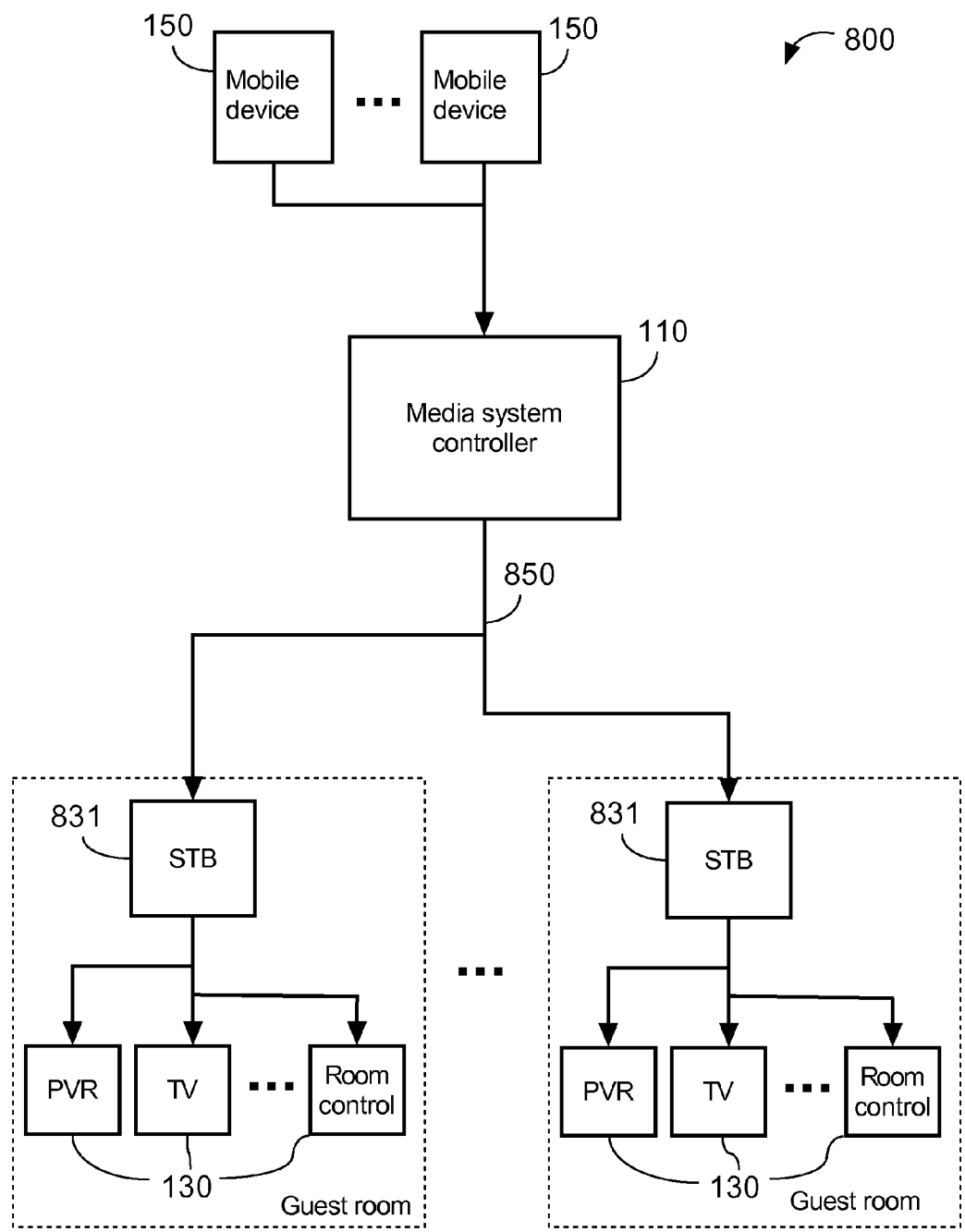
FIG. 8 illustrates how commands received from a mobile device may be passed from the media system controller to a set-top box in a guest room in order to thereby control other controllable devices in the room.

FIG. 8 illustrates how commands received from a mobile device 150 may be passed from the media system controller 110 to a set-top box 831 in a guest room in order to thereby control other controllable devices 130 in the room. In FIG. 8, the arrows on the lines correspond to the direction of controlling commands received from the mobile device 150. In this configuration, the STBs 831 operate as in-room controllers of the other in-room controllable devices 130. The STB 831 also passes back status information from each of the controllable devices 130 to the media system controller 110, which forwards it back to the mobile devices 150. A benefit of this configuration is that an older generation media system may already have an existing network (or other available connections) 850 in the hotel that can be utilized to connect a central location housing the media system controller 110 to all the various in-room STBs 831. In this way, the media system controller 110 may perform the authentication for all the mobile devices 150 and pass commands to in-room STBs. It should also be noted that the functions of STB 831 may also be integrated with one or more of the other controllable devices 130. For example, a television or PVR may include STB functionality embed therein.

Figure 9:
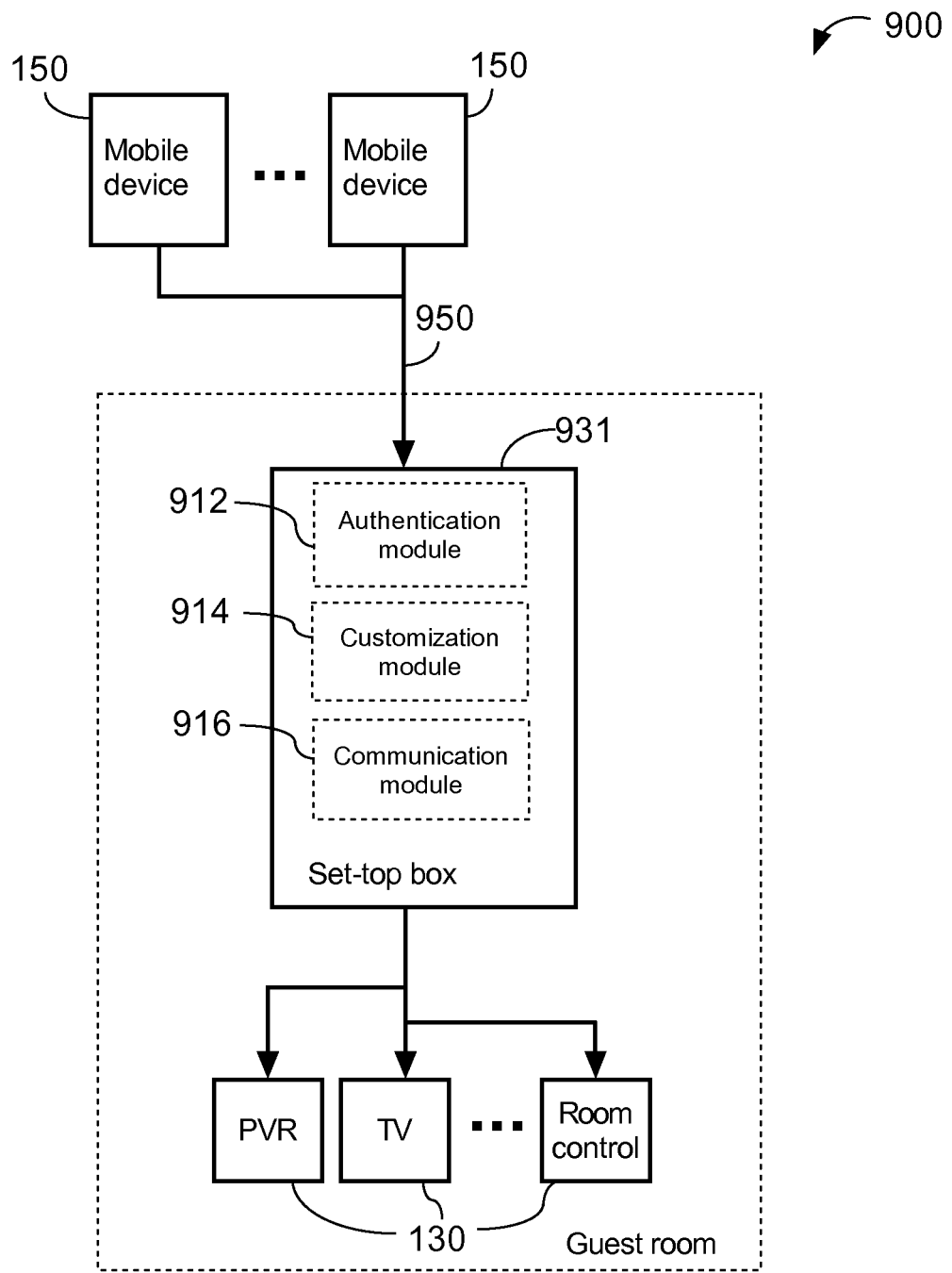
FIG. 9 illustrates how commands from a mobile device may be received directly by an in-room STB in order to control other controllable devices in the room.

FIG. 9 illustrates how commands from a mobile device 150 may be received directly by an in-room STB 931 in order to control other controllable devices 130 in the room. The arrows in FIG. 9 again correspond to the direction of controlling commands received from the mobile device 150. In this configuration, a STB 931 in a guest room includes an authentication module 912, customization module 914, and a communication module 916. The communication module 916 in the STB 931 may support any number of data modes including ports for a direct wired connection such as USB, Ethernet, or Firewire; a wireless connection such as Wi-Fi or Bluetooth, or any other type of connection. Mobile devices 150 connect to the STB 931 via a data connection 950 which could be either a networked, direct, or indirect connection according to the modes supported by the communication module 916. Once connected the customization module 914 and authentication module 912 operate similar to as described above for FIG. 1 to perform customization and authentication functions. In some configurations, the STB 931 may communicate to a media system controller 110 (see FIG. 1) to support the customization and authentication functions. In other configurations, the STB 931 may perform these functions itself. For example, authentication may be performed via a passkey that is generated and displayed on a TV 130 by the STB 931. The mobile device 150 then transmits the same passkey back to the STB 931 to thereby prove its operator is authorized to operate all the in-room controllable devices 130, 931. In this way, in-room authentication may be performed without requiring assistance from the media system controller 110. Customization information may be pre-stored in the STB 931, and may also be determined automatically by the STB 931 according to which other controllable devices 130 are coupled to the STB 931. In this way, a plurality of authentication modules 912, customization modules 914, and communication modules 916 may be distributed in the STBs 931 of the various guest rooms in the hotel.

According to the invention, guests may operate the hotel's media system from the guest's own mobile device. In doing so, there are at least four major benefits:

1. Familiar Hardware Platform and User Interface

Guests often bring their own laptops, mobile phones, tablet computers, music players and other mobile devices with them as they travel. Such guests are typically also very familiar and comfortable with the user interface and operation of their own devices, and since they carry the equipment with them, there are no new hardware systems to learn as they stay in different hotels.

2. One Mobile/Web Application for Multiple Hotels

A media system control application 152 for controlling the hotel media systems 100 may be provided for users to install on the mobile platform 150 of their choice. The application 152 may appear and operate the same at all hotels. Alternatively, different hotels or chains may vary certain elements of the application related to branding such as logos and color schemes, or enable additional features and functions. Because one mobile application 152 may be used to control multiple hotels, basic functionality may be substantially the same or at least very similar at multiple hotels. This allows the user to reuse their already-learned knowledge to operate different media systems 100 at different hotels. Similarly, a consistent web interface may be provided across hotels.

Additionally, the mobile application and web interface may also provide device-specific Help information to the guest. Having 1-click Help functionality built into the mobile or web app ensures users always have a quick resource available to answer their "how does this device work?" or "how do I use this?" questions. For example, the media system 100 may include a general overview of how a PVR system works that would be available at any time, as well as a PVR-specific help button available on the IPG page that would lead the guest through the specific steps to record and watch TV shows on a particular system.

3. Guest can Operate in-Room Controllable Devices Even when not in Room

Because most users' mobile devices 150 include some kind of wireless or wired communication technology, once authorized by a hotel's media system 100, there is nothing stopping the guest from operating the media system 100 even when the guest is outside of their registered room. That is, no matter where the guest is physically located, as long as some kind of a connection to the hotel media system 100 is available, the guest may control in-room and other hotel equipment 130 from their mobile device 150. One example is, while eating dinner in the hotel's restaurant, the guest may view the IPG for the television in the guest's room and choose programs to record for later viewing when they are finished eating. The recording could take place on a PVR installed within the guest's room, or may be done at a network-PVR installed anywhere in the hotel's media system 100. Recorded programs may then be viewed later in the guest's room or even via the mobile device itself if bandwidth and multimedia capabilities of the network and mobile device are sufficient. Any menus or other control elements for devices of the hotel media system 100 in the guest's room may also be controlled from the guest's mobile device. Examples include in-room STB, PVR, television, audio system, room lights, AC/heater, etc. In-room controllable devices also include devices that are physically installed at other locations in the hotel but are controllable from within the guest's registered room such as the network PVR 130 of FIG. 1.

4. Multiple Authorized Devices and Controllers

There can be more than one authorized mobile device 150 that is allowed to control a single controllable device 130. For example, a conference or meeting room 104 will often have multiple "guests" and the hotel media system 100 may allow more than one person to control something in the room. One mobile device 150 may be able to do everything, one may only do the audio, one may only do the lights, etc. In other words, there can be more than one authorized user per controllable device at a time. Another example would be a Hotel staff member or Support Agent authorizing a device in order to assist a customer/guest if necessary. Once the state of a particular controllable device 130 changes, updated status information will be sent to all mobile devices authorized to operate that controllable device.

In another configuration, the invention may be utilized to interface with other hotel functions that are not a part of the entertainment system. For example, with reference to FIG. 1, the hotel media system 100 may also be for allowing a guest to perform check-in and check-out functions from their mobile device 150. In this configuration, the media system controller 110 may update the information in the database 118 when the guest either checks in or checks out from their mobile device. The database 118 may be a part of the hotel's PMS and therefore the guest's mobile device 150 is in effect operating the PMS. The hotel's PMS may also be utilized by the authentication module 112 for determining the authorized subset of the controllable devices for which a mobile device is authorized to control. In general, the mobile devices 150 may be authorized by the media system controller 110 to operate any type of controllable device 130. User authentication may play a role on what operations are available for particular controllable devices 130.

Another benefit is either a media system vendor or a particular hotel can push automatic updates to the guest using the mobile application. For example, the hotel could push out ads or information about upcoming sales, etc. This could be as either a content update of the app, or even a new software version that would automatically trigger the mobile device to inform the user that an update is available. Messages and announcements may also be transferred to user's mobile devices.

A further advantage is the hospitality media system may automatically authorize a user to use a mobile device to control the in-room devices in the room(s) for which the user is currently registered. When the room is no longer registered to the user, the media system may automatically de-authorize the user from controlling in-room devices. The process may then repeat with each future guest staying in the room. This is highly beneficial for hospitality locations such as hotels that may have thousands of rooms including guest rooms, meeting rooms, and conference rooms, and continuously arriving and departing guests, each of who may bring one or more mobile devices they wish to operate in-room controllable devices during their stay at the hotel.

In summary, a hospitality media system includes a media system controller and a plurality of controllable devices operable by the media system controller, each of a plurality of rooms having one or more in-room controllable devices. A communication module performs data communications with a mobile device. An authentication module receives identification information from the mobile device, determines a registered room currently associated with the identification information, and includes in an authorized subset of the controllable devices for which the mobile device is authorized to operate at least the in-room controllable devices of the registered room. The media system controller operates the authorized subset of the controllable devices in dependence upon commands received from the mobile device.

In the above description, the exemplary user indication of "guest" refers to current guests in the hotel, people who are attending a conference or meeting in the hotel, staff members at the hotel, or any other person or user who may need or want to operate a hospitality media system. Future guests that have reservations, potential future guests that don't yet have reservations, and other users may also be given access for certain in-room functions. For example, a demonstration of the technology may be available in the hotel lobby and all users would be able to utilize their own mobile devices 150 to control in-room controllable devices 130 installed in the lobby in order to try out the system 100. Additionally, it is not necessary that the users bring their own mobile device 150. In another configuration, the mobile device 150 may be provided to the user by the hotel. It should also be noted that the term "mobile" is utilized to mean the device is capable of being moved. Although portable devices that are easily carried are anticipated by the inventors as being particularly useful, it is not a strict requirement that the mobile devices be easily carried. Other devices such as desktop computers that are of a more permanent nature may also act as mobile devices in conjunction with the invention.

Although the invention has been described in connection with a preferred embodiment, it should be understood that various modifications, additions and alterations may be made to the invention by one skilled in the art without departing from the spirit and scope of the invention as defined in the appended claims. For example, although the invention has been described as being utilized at a hotel, the invention is equally applicable to any hospitality related location or service wishing to provide users with a media system including but not limited to hotels, motels, resorts, hospitals, apartment/townhouse complexes, restaurants, retirement centers, cruise ships, busses, airlines, shopping centers, passenger trains, etc. The invention may also be utilized to control other systems and services outside a hotel's media system. For example, hotel's PMS, reporting, or administration systems. The various separate elements, features, and modules of the invention described above may be integrated or combined into single units. Similarly, functions of single elements, features, and modules may be separated into multiple units. The modules may be implemented as dedicated hardware modules, and the modules may also be implemented as one or more software programs executed by a general or specific purpose processor to cause the processor to operate pursuant to the software program to perform the above-described module functions. For example, the media system controller 110 of FIG. 1 may be implemented by a computer server having one or more processors 170 executing a computer program loaded from a storage media 172 to perform the functions of the authentication module 110, communication module 116, and/or the customization module 114. In addition to a dedicated physical computing device, the word "server" may also mean a service daemon on a single computer, virtual computer, or shared physical computer, for example. Unless otherwise specified, features described may be implemented in hardware or software according to different design requirements. Additionally, all combinations and permutations of the above described features and configurations may be utilized in conjunction with the invention.

What is claimed is:

1. A hospitality media system comprising:
   a media system controller;
   a plurality of controllable devices accessible from within a plurality of rooms of a hospitality establishment, the controllable devices coupled to the media system controller by a computer network and preconfigured such that each of the controllable devices is in communication with and remotely operable by the media system controller via the computer network; and
   a database storing an association between each of the rooms and one or more of the controllable devices that are accessible to a user within each room, the one or more of the controllable devices that are accessible within a particular room hereinafter referred to as in-room controllable devices of the particular room;
wherein the media system controller is operable to:
generate a passkey in response to an occurrence of a first event associated with the particular room without establishing data communications with a mobile device operated by a user of the particular room;
store in the database an association between the passkey and the particular room;
cause the passkey to be displayed on a display device located within the particular room, whereby after being displayed in the particular room the passkey is entered into the mobile device by the user of the particular room;
establish data communications with the mobile device and receive the passkey from the mobile device;
query the database to find the particular room currently associated with the passkey received from the mobile device, whereby the particular room currently associated with the passkey is found to be the particular room in which the passkey was displayed;
query the database to find the in-room controllable devices of the particular room found associated with the passkey received from the mobile device;
include in an authorized subset of the controllable devices for which the mobile device is authorized to operate at least the in-room controllable devices of the particular room found associated with the passkey received from the mobile device;
operate the authorized subset of the controllable devices in dependence upon commands received from the mobile device until an occurrence of a second event associated with the particular room; and
remove from the database the association between the passkey and the particular room in response to the occurrence of the second event.

2. The hospitality media system of claim 1, wherein the first event corresponds to a guest checking in to the particular room and the second event corresponds to the guest checking out of the particular room.

3. The hospitality media system of claim 1, wherein the first event corresponds to a guest entering the particular room and the second event corresponds to a new guest entering the particular room.

4. The hospitality media system of claim 1, wherein the second event corresponds to an end time of a conference or other event at the hospitality establishment.

5. The hospitality media system of claim 1, wherein the second event automatically occurs a specific time duration after the first event.

6. The hospitality media system of claim 1, wherein media system controller is further operable to randomly generate the passkey in response to the occurrence of the first event associated with the particular room.

7. The hospitality media system of claim 1, wherein the media system controller is further operable to transfer status information corresponding to the authorized subset of the controllable devices to the mobile device.

8. The hospitality media system of claim 7, wherein the status information includes data for displaying an interactive program guide on the mobile device customized to list only content that is available on the in-room controllable devices of the particular room.

9. The hospitality media system of claim 1, wherein the media system controller is further operable to:
transfer customization information specific to the hospitality establishment to a predetermined application running on the mobile device after a connection to the mobile device has been established;
wherein the predetermined application is compatible with and may be customized by a plurality of different hospitality establishments.

10. The hospitality media system of claim 1, wherein the media system controller is further operable to authorize a plurality of mobile devices to operate a single controllable device.

11. The hospitality media system of claim 1, wherein the media system controller is further operable to include in the authorized subset the in-room controllable devices of a plurality of rooms of the hospitality establishment that are currently associated with the passkey in the database.

12. The hospitality media system of claim 1, wherein the media system controller is further operable to:
store in the database an association between a unique identifier received from the mobile device and the particular room after determining the particular room currently associated with the passkey received from the mobile device; and
perform subsequent authentications of the mobile device according to the unique identifier of the mobile device and its association with the particular room as looked up in the database.

13. A method of operating a plurality of controllable devices accessible from within a plurality of rooms of a hospitality establishment, the controllable devices coupled to a media system controller by a computer network and preconfigured such that each of the controllable devices is in communication with and remotely operable by the media system controller via the computer network, the media system controller having a database storing an association between each of the rooms and one or more of the controllable devices that are accessible to a user within each room, the one or more of the controllable devices that are accessible within a particular room hereinafter referred to as in-room controllable devices of the particular room; the method comprising:
generating a passkey in response to an occurrence of a first event associated with the particular room without establishing data communications with a mobile device operated by a user of the particular room;
storing in the database an association between the passkey and the particular room;
displaying the passkey on a display device located within the particular room, whereby after being displayed in the particular room the passkey is entered into the mobile device by the user of the particular room;
establishing data communications with the mobile device and receiving the passkey from the mobile device;
querying the database to find the particular room currently associated with the passkey received from the mobile device, whereby the particular room currently associated with the passkey is found to be the particular room in which the passkey was displayed;
querying the database to determine the in-room controllable devices of the particular room found associated with the passkey received from the mobile device;
including in an authorized subset of the controllable devices for which the mobile device is authorized to operate at least the in-room controllable devices of the particular room found associated with the passkey received from the mobile device;
operating the authorized subset of the controllable devices in dependence upon commands received from the mobile device until an occurrence of a second event associated with the particular room; and removing from the database the association between the passkey and the particular room in response to the occurrence of the second event.

14. The method of claim 13, wherein the first event corresponds to a guest checking in to the particular room and the second event corresponds to the guest checking out of the particular room.

15. The method of claim 13, wherein the second event automatically occurs a specific time duration after the first event.

16. The method of claim 13, wherein the first event corresponds to needing to display the passkey within the particular room.

17. The method of claim 13, further comprising storing in the database the association between the passkey and the particular room when the passkey is displayed on the display device located within the particular room.

18. The method of claim 13, wherein:
the hospitality establishment is a hotel, and
the controllable devices are audio/visual entertainment devices accessible from guest rooms of the hotel.

19. A non-transitory computer-readable medium comprising computer executable instructions that when executed by a computer cause the computer to perform the method of claim 13.

20. A media system controller for operating a plurality of controllable devices accessible from within a plurality of rooms of a hospitality establishment, the controllable devices coupled to the media system controller by a computer network and preconfigured such that each of the controllable devices is in communication with and remotely operable by the media system controller via the computer network; the media system controller comprising:
a database storing an association between each of the rooms and one or more of the controllable devices that are accessible to a user within each room, the one or more of the controllable devices that are accessible within a particular room hereinafter referred to as in-room controllable devices of the particular room; and
one or more processors operable to:
generate a passkey in response to an occurrence of a first event associated with the particular room without establishing data communications with a mobile device operated by a user of the particular room;
store in the database an association between the passkey and the particular room;
cause the passkey to be displayed on a display device located within the particular room, whereby after being displayed in the particular room the passkey is entered into the mobile device by the user of the particular room;
establish data communications with the mobile device and receive the passkey from the mobile device;
query the database to find the particular room currently associated with the passkey received from the mobile device, whereby the particular room currently associated with the passkey is found to be the particular room in which the passkey was displayed;
query the database to find the in-room controllable devices of the particular room found associated with the passkey received from the mobile device;
include in an authorized subset of the controllable devices for which the mobile device is authorized to operate at least the in-room controllable devices of the particular room found associated with the passkey received from the mobile device;
operate the authorized subset of the controllable devices in dependence upon commands received from the mobile device until an occurrence of a second event associated with the particular room; and
remove from the database the association between the passkey and the particular room in response to the occurrence of the second event.

\* \* \* \* \*